Feb. 28, 1967 R. E. GRANTHAM 3,306,206
RADIO FREQUENCY FREE COMMUNICATION SYSTEM
Original Filed Dec. 4, 1962
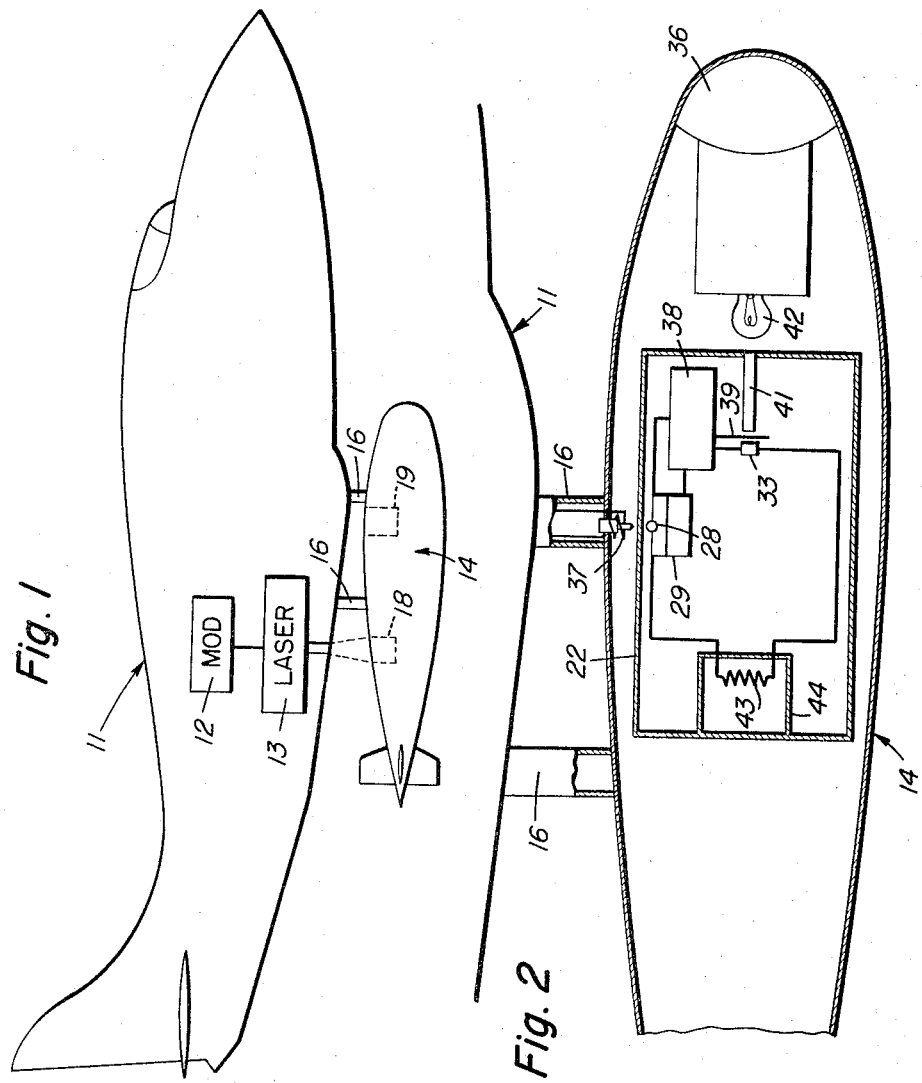
INVENTOR
Rodney E. Grantham
BY
ATTORNEYS

United States Patent Office 3,306,206
Patented Feb. 28, 1967

3,306,206
RADIO FREQUENCY FREE COMMUNICATION SYSTEM
Rodney E. Grantham, Bethesda, Md., assignor to the United States of America as represented by the Secretary of the Navy
Original application Dec. 4, 1962, Ser. No. 242,332, now Patent No. 3,228,337, dated Jan. 11, 1966. Divided and this application Sept. 16, 1965, Ser. No. 487,936
3 Claims. (Cl. 102—70.2)

The invention described herein may be manufactured and used by or for the Government of the United States of America of governmental purposes without the payment of any royalties thereon or therefor.

This is a division of application Serial No. 242,332 filed December 4, 1962, now Patent No. 3,228,337.

The present invention relates to a communication system whirch is free from radio frequency interference and utilizes direct current and light energy to accomplish transmission of intelligence between two points.

The prior art methods of communicating intelligence from a part of an aircraft to a missile, which the aircraft was carrying, was generally accomplished by a cable connected directly from the missile to the aircraft to conduct electrical impulses. This system was susceptible to stray radio frequency energy aboard the aircraft and within the atmosphere, so that it was possible for the receiver within the missile to interpret the stray radio frequency energy as a valid command thereby resulting in a hazard from malfunction. The system worked well in the slower aircraft, but in high speed aircraft the physical umbilical cord connection between the aircraft and the bomb is often broken due to the whipping back and forth in the wind. Furthermore, the umbilical cord is a means of transmitting unwanted radio frequency voltages from the aircraft's radar and radio equipment to the missile thereby creating a hazard to safety from malfunction.

The general purpose of this invention is to provide a new and improved communication system between an aircraft and the missile which it is carrying by providing radio frequency conductive shield means for enclosing the receiver and at the same time eliminating the mechanical linkage between an aircraft and the missile and yet maintaining the advantages of radio communication. In the illustrative embodiments of the present invention a means is provided for activating a battery electromechanical energy for enabling the fuzing and arming devices of the missile to be properly set.

An object of the present invention is to provide a self-powered completely detached radio-frequency free receiver operable in response to coded light energy input pulses.

Another object is to provide a fuzing and arming device which is more free from surreptitious tampering.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a side view of the laser communication system situated in an aircraft partially cut away; and FIG. 2 is a schematic diagram of another embodiment of the invention in which the laser is replaced by more conventional components.

FIG. 1 illustrates an aircraft 11 containing a modulator 12 which is connected to a laser 13 for modulating the light energy output of the laser in accordance with a selected input to the modulator 12. A missile 14 is suspended beneath the aircraft 11 by conventional attach and release means 16. The missile 14 is positioned under the aircraft 11 so that the modulated output of laser 13 is focused to actuate a battery in well 18 within the missile 14. A photoconductive light detector is positioned in a well 19 forward of the well 18 in the missile to be activated by the modulated laser output light energy after the missile is released from the aircraft.

The explosive primer 28 is located in the topmost portion of a battery shown generally at 29. Upon explosion of the explosive primer 28 the electrolyte is forced from the uppermost container of the battery 29 and flows between the plates thereby energizing the battery 29 to provide electrical power to the other circuitry within the missile 14. Another type battery 29 which is suitable in this application is of the thermal type battery, as disclosed in Tenth Annual Battery Research Conference "Thermal Cells" by E. McKee, pages 26–28, wherein the electrolyte is in the solid state until a sufficient amount of energy is absorbed to change the state of the electrolyte from the solid to the liquid state at which time the battery becomes activated.

The sequence of operation of the release for the missile 14 from the aircraft 11 would be a first command from the pilot to activate the battery 29 by means of a single burst of energy followed by a subsequent command to release the missile from the aircraft.

FIG. 2 illustrates another embodiment of the invention and shows the aircraft 11, the missile 14 and attaching and releasing means 16. The device of FIG. 2 does not utilize a laser but utilizes a D.C. pulse from the aircraft 11 to energize a solenoid 37 which drives a pin through the RF shield 22 and into an explosive primer 28 to cause activation of the battery 29 in a manner similar to that described hereinbefore. This activation of the battery is coincidental and simultaneous with the release of the missile from the aircraft, and since the solenoid 37 is sensitive only to a D.C. pulse source, it is free from actuation by RF voltages. The RF shield 22 completely encloses all of the electrical circuitry associated with the detonating warhead including the power source battery 29, thereby maintaining that circuitry free from all RF voltages generated on the airfield or within the aircraft 11. The activation of the battery 29 causes a time delay device 38 to become activated and after a predetermined time close a switch to connect the electrical power from the battery 29 to the PNPN light sensitive switch 33 and simultaneously remove an optical shutter 39 from the light path to the PNPN light sensitive switch 33 through a suitable light tube 41; which can either be a hollow tube, a piece of Lucite, an optical prism or any other light conducting means. Attached to the nose of the missile 14 is a preset fuzing and arming device 36 in which the fuze is set before the missile is placed on the aircraft and could be any of the aforementioned types such as a proximity fuze so that after release of the missile from the aircraft and upon the missile's approach to the target the proximity fuze and arming device activates a light and power source 42 which light would be conducted down the light tube 41 to close the PNP light sensitive switch. The closing of the last mentioned switch causes the electrical power from the battery to pass through the resistor primer 43 to cause ignition of the explosive contained within the primer box 44 and thereby ignite the warhead, which is carried in the missile 14, by fracturing the RF conductive skin 22.

The embodiment of FIG. 2 utilizes the principal of shielding the detonating device from all RF energy and of detonating the device by means of light energy.

It should be understood, of course, that the foregoing disclosure relates to only several illustrative embodiments of the invention and that numerous modifications or alterations may be made therein without departing from the spirit and scope of the invention as set forth in the appended claims.

What is claimed is:
1. A detonator for use in an explosive missile comprising:
   a battery,
   an explosive primer operatively connected to said battery for activating said battery upon detonation of said primer,
   a photoconductive switch means for closing a circuit upon energization by a light source,
   time delay safety means shielding said photoconductive switch means from light activating energy for a predetermined time after activation of said battery,
   a resistive primer in contact with initiating means for detonating a warhead in the missile upon energization of the resistive primer by electrical energy,
   a series circuit formed by connecting together said photoconductive switch means, said resistive primer and said battery,
   a conductive shield enclosing and forming a radio frequency free enviroment for said battery, said photoconductive switch means, and said resistive primer,
   means for detonating said explosive primer,
   and light means operatively connected to said photoconductive switch means for selectively closing said last named means.
2. Apparatus as recited in claim 1 wherein said means for detonating said explosive primer includes a solenoid having a plunger for piercing said conductive shielding and said explosive primer thereby causing detonation of said explosive primer.
3. Apparatus as recited in claim 2 wherein said light means includes
   a light source,
   a fuze mean connected to said light source for activating said light source upon occurrence of predetermined conditions,
   and a light conductive means positioned between said light source and said photoconductive switch means for transmitting light waves from said light source to said photoconductive switch means.

References Cited by the Examiner
UNITED STATES PATENTS

| | | | |
|---|---|---|---|
| 2,927,213 | 3/1960 | Marion et al. | 102—70.2 X |
| 2,931,848 | 4/1960 | Burrel | 102—70.2 X |

BENJAMIN A. BORCHELT, *Primary Examiner.*

W. C. ROCH, *Assistant Examiner.*